United States Patent [19]

Miyashita et al.

[11] Patent Number: 4,914,152

[45] Date of Patent: Apr. 3, 1990

[54] POLYESTER RESIN COMPOSITION

[75] Inventors: Shunitsu Miyashita, Kobe; Kenji Mogami, Settsu, both of Japan

[73] Assignee: Kanegafuchi Kagaku Kogyo Kabushiki, Osaka, Japan

[21] Appl. No.: 122,738

[22] Filed: Nov. 19, 1987

[30] Foreign Application Priority Data

Nov. 20, 1986 [JP] Japan ................................ 61-276927
May 30, 1987 [JP] Japan ................................ 62-135805

[51] Int. Cl.$^4$ ............................................. C08L 67/02
[52] U.S. Cl. ........................................ 525/68; 525/64; 525/92; 525/132; 525/150; 525/166; 525/176
[58] Field of Search .................... 525/166, 176, 92, 64, 525/68, 132, 150

[56] References Cited

U.S. PATENT DOCUMENTS

| | | | |
|---|---|---|---|
| 3,435,093 | 3/1969 | Cope | 525/176 |
| 3,639,527 | 2/1972 | Brinkmann | 525/176 |
| 4,172,859 | 10/1979 | Epstein | 525/109 |
| 4,223,106 | 9/1980 | Bier | 525/173 |
| 4,659,757 | 4/1987 | Okamoto | 523/436 |

FOREIGN PATENT DOCUMENTS

| | | | |
|---|---|---|---|
| 1577947 | 8/1969 | France . | |
| 59-115352 | 7/1984 | Japan . | |
| 59-184251 | 10/1984 | Japan | 525/166 |
| WO85/03718 | 8/1985 | PCT Int'l Appl. | 525/166 |

OTHER PUBLICATIONS

Patent Abstracts of Japan, vol. 9, No. 41 (C-267)(1764), 21st Feb. 1985; & JP-A-59 184 251 (Toray K.K.) 19-10-1984.

Patent Abstracts of Japan, vol. 11, No. 297 (C-449)(2744) 25th Sep. 1987; JP-A-62 89760 (Kanegafuchi Chem. Ind. Co. Ltd) 24-04-1987.

Patent Abstracts of Japan, vol. 11, No. 30 (C-400)(2477) 29th Jan. 1987; JP-A-61 200159 (Unitika Ltd) 04-09-1986 (Cat. A).

Patent Abstracts of Japan, vol. 9, No. 324 (C-320)(2047) 19th Dec. 1985; & JP-A-60 155 235 (Nippon Ester K.K.) 15-08-1985.

Primary Examiner—Patricia Short
Attorney, Agent, or Firm—Armstrong, Nikaido, Marmelstein, Kubovcik & Murray

[57] ABSTRACT

A polyester resin composition having an improved molding processability and capable of providing molded articles having an improved impact resistance and other excellent properties such as mechanical strength and heat resistance, which comprises (a) a thermoplastic polyester, e.g. polyethylene terephthalate or a modified polyethylene terephthalate, (b) a polymer containing at least one epoxy group per molecule and having a modulus of elasticity of at most $10^4$ kg/cm$^2$, e.g. an $\alpha$-olefin/glycidyl ester or ether copolymer, and (c) a copolymer of an $\alpha$-olefin and an $\alpha,\beta$-unsaturated carboxylic acid wherein at least 5% by mole of the carboxyl groups are neutralized with an alkali metal.

11 Claims, No Drawings

POLYESTER RESIN COMPOSITION

BACKGROUND OF THE INVENTION

The present invention relates to a themoplastic polyester resin composition having excellent toughness and mechanical strength, and more particularly to a thermoplastic polyester resin composition capable of providing molded articles having an improved impact resistance and other excellent properties such as tensile strength, elongation and heat resistance.

Representative thermoplastic polyester resin is polyethylene terephthalate. Polyethylene terephthalate has excellent mechanical properties and excellent chemical properties and, therefore, it has been widely used as materials for fibers, films and moldings.

However, polyethylene terephthalate has the disadvantages that the rate of crystallization and impact resistance are relatively low. Since the crystallization rate is relatively low, the injection molding must be conducted at a mold temperature higher than 140° C. Comparing with other polyester resins, e.g. polybutylene terephthalate for which the mold temperature in injection molding is about 40° C. or higher, polyethylene terephthalate requires a higher mold temperature.

It is known to use various kinds of crystallizing accelerators in order to improve the above disadvantages. For instance, Japanese Patent Publication Kokoku No. 48-4097 and No. 48-4098 propose to incorporate metal salts of organic acids, and Japanese Patent Publication Kokoku No. 55-47059 proposes to incorporate a plasticizer and an ionomer. The use of these crystallizing accelerators is effective for lowering the mold temperature in injection molding to a practical level, but the mechanical strength and impact resistance are not sufficiently improved.

It is also proposed to introduce a soft segment to polyethylene terephthalate by copolymerization in order to raise the crystallization rate simultaneously with an improvement in impact resistance. For instance, Journal of Polymer Science, Vol. 8, 1 (1952) discloses a copolymerization with polyethylene glycol. Japanese Patent Publication Kokai No. 61-243854 discloses a copolymerization of polyethylene terephthalate with an addition polymerization product of an alkylene oxide to a polyalkylene glycol or a bisphenol compound. The introduction of a soft segment, particularly polyalkylene glycols, improves the impact resistance of molded articles, but the mechanical strength is lowered.

An improvement in the impact resistance of molded articles of thermoplastic resins has been made generally by blending thermoplastic resins with elastomers. To thermoplastic polyester resins, including polyethylene terephthalate, which are one of engineering plastics, the method of blending elastomers has been also applied. It is proposed to blend thermoplastic polyester resins with copolymers of an α-olefin and an α,β-unsaturated carboxylic acid glycidyl ester in an attempt to improve the impact resistance of polyester moldings, as disclosed in Japanese Patent Publication Kokoku No. 58-47419 and Japanese Patent Publication Kokai Nos. 53-117049, 58-17148, 59-115352 and 61-207458. However, these proposals have the disadvantages that no satisfactory improvement in impact resistance is obtained for some polyester resins. No theory about what elastomers are effective for improving the impact resistance has been established. Also, there are cases where if high performance engineering plastics are blended with elastomers having a relatively low elasticity, the impact resistance is improved, but excellent other properties expected as engineering plastics are impaired. Accordingly, it is the present state that experiments must be repeated by combining the objective thermoplastic polyester with various kinds of elastomeric materials in order to look for the suitable elastomeric materials.

It is an object of the present invention to provide a thermoplastic polyester resin composition capable of providing molded articles having well-balanced excellent properties at a low mold temperature.

A further object of the invention is to provide a composition capable of providing molded articles of polyethylene terephthalate resins having an excellent balance between mechanical strength, elongation, impact resistance and heat resistance.

A still further object of the invention is to provide a composition capable of providing molded articles of thermoplastic polyester resins having an improved impact resistance without substantially impairing mechanical strength, heat resistance and chemical properties.

These and other objects of the present invention will become apparent from the description hereinafter.

SUMMARY OF THE INVENTION

In accordance with the present invention, there is provided a polyester resin composition comprising (a) a thermoplastic polyester, (b) 1 to 100 parts by weight of a polymer containing at least one epoxy group per molecule and having a modulus of elasticity in bending of at most $10^4$ kg/cm$^2$ at room temperature, and (c) 0.5 to 100 parts by weight of a copolymer of an α-olefin and an α,β-unsaturated carboxylic acid wherein at least 5% by mole of the carboxyl groups are neutralized with an alkali metal, said parts being parts by weight per 100 parts by weight of the component (a).

The composition of the invention has an improved processability and provides molded articles having well-balaced excellent properties such as mechanical strength, elongation, impact resistance and heat resistance.

DETAILED DESCRIPTION

Examples of the thermoplastic polyester used in the present invention are, for instance, a linear saturated polyalkylene terephthalate resin obtained by a reaction of an acid component containing at least 90% by mole of terephthalic acid or its derivatives having an ester-forming ability and a glycol component containing at least 90% by mole of a glycol having 2 to 10 carbon atoms, especially an alkylene glycol, or the derivatives thereof having an ester-forming ability, representative examples of which are polyethylene terephthalate and polybutylene terephthalate; a mixture of polyalkylene terephthalate resins such as a mixture of at least 30% by weight, preferably at least 50% by weight, of polyethylene terephthalate with polybutylene terephthalate; a mixture of at least 30% by weight, preferably at least 50% by weight, of polyethylene terephthalate with polycarbonate; a copolymer of a polyethylene terephthalate resin containing at least 25% by weight, preferably at least 30% by weight, of ethylene terephthalate units, a representative example of which is polyethylene terephthalate, and a component copolymerizable with the polyethylene terephthalate resin, e.g. a dicarboxylic acid such as isophthalic acid, 2,6-naphthalenedicarboxylic acid, adipic acid or sebacic acid, a diol compound such as propane-1,3-diol, butane-1,4-diol, pentane-1,5-diol or 2,2-bis(4'-hydroxyphenyl)propane, and a polyether compound, especially a block copolymer of the polyethylene terephthalate resin and the polyether compound; and the like. These thermoplastic polyester resins may be used alone or in admixture thereof.

The term "polyethylene terephthalate" as used herein means a reaction product of an acid component containing at least 90% by mole of terephthalic acid or its derivatives having an ester-forming ability and a glycol component containing at least 90% by mole of ethylene glycol or its derivatives thereof having an ester-forming ability.

The polyalkylene terephthalate may contain less than 10% by mole of dicarboxylic acids other than terephthalic acid or its derivatives and less than 10% by mole of diol comppounds other than the alkylene glycol having 2 to 10 carbon atoms or its derivatives. The dicarboxylic acids include, for instance, an aromatic dicarboxylic acid having 6 to 14 carbon atoms, an aliphatic dicarboxylic acid having 4 to 8 carbon atoms, and an alicyclic dicarboxylic acid having 8 to 12 carbon atoms. Typical examples thereof are phthalic acid, isophthalic acid, 2,6-naphthalenedicarboxylic acid, 4,4'-diphenyldicarboxylic acid, adipic acid, sebaic acid and cyclohexanedicarboxylic acid. The diol compounds include, for instance, an aliphatic diol having 3 to 10 carbon atoms, an alicyclic diol having 6 to 15 carbon atoms and an aromatic diol having 6 to 15 carbon atoms. Typical examples thereof are propane-1,3-diol, butane-1,4-diol, pentane-1,5diol, hexane-1,6-diol, cylcohexane-1,4-dimethanol, 2,2-dimethylpropane-1,3-diol, 2,2-bis(4'-hydroxycyclohexyl)propane, 2,2-bis(4'-hydroxyphenyl)-propane and hydroquinone.

Usually, the polyalkylene terephthalate used in the invention has an intrinsic viscosity of 0.35 to 1.20 (0.5 wt. % concentration in phenol/tetrachloroethane=50/50 by weight, 25° C.). In particular, from the viewpoint of balance between crystallization rate and mechanical strength, polyalkylene terephthalate having an intrinsic viscosity of 0.40 to 0.70, especially 0.45 to 0.65, are preferred.

The above-mentioned polyether compound used in the preparation of the block copolymer is a compound consisting essentially of units of the formula (1):

wherein
$R^2$ is a bivalent group having 2 to 18 carbon atoms,
p is an integer of 5 to 40, and
the units may contain different $R^2$ from each other.

The both ends of the polyether compound are usually hydroxyl groups, but are not limited thereto and may be groups copolymerizable with the polyethylene terephthalate resin. The ($R^2O$) units serve to accelerate the crystallization rate and to improve the impact resistance.

Representative examples of the polyether compound are, for instance, compounds having the units $(R^2O)_p$ wherein $R^2$ is one or more of ethylene, propylene, isopropylene, butylene and bisphenol A residues. In particular, in view of high crystallization rate, good heat stability in injection molding and improvement in impact resistance, there are preferred, as the polyether compound, polyethylene glycol, polypropylene glycol, polytetramethylene glycol, polyoxyethylenepolyoxypropylene copolymer, and a polyether compound having units of the formula (2):

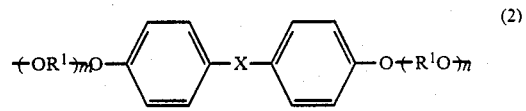

wherein
$R^1$ is a bivalent hydrocarbon group having 2 to 4 carbon atoms,
X is a single bond or a bivalent group, e.g. —C(CH$_3$)$_2$—, —CH$_2$—, —S—, —SO$_2$— or —CO—,
m and n are independently an integer of 5 to 20, and the $R^1$ groups in respective units may be different from each other.

The content of the polyether compound in the block copolymer is from 2 to 90% by weight, preferably 5 to 60% by weight, more preferably 25 to 50% by weight. When the content of the polyether compound is less than 2% by weight, the crystallization rate is not sufficiently increased, and when the content is more than 90% by weight, the mechanical strength and moisture resistance of molded articles are remarkably lowered.

The block copolymers of polyethylene terephthalate and the polyether compound have usually an intrinsic viscosity of 0.35 to 1.20 (0.5 wt, % concentration in phenol/tetrachloroethane=50/50 by weight, at 25° C.). In particular, the block copolymers having an intrinsic viscosity of 0.40 to 1.00, especially 0.50 to 0.80, are preferred from the viewpoint of the balance between the crystallization rate and the mechanical strenght.

The preparation of the block copolymers may be effected by block-copolymerizing polyethylene terephthalate with the polyether compound in the reactor for synthesis of the polyethylene terephthalate, or may be effected using an extruder to react them.

A mixture of polyethylene terephthalate and the polyethylene terephthalate/polyether block copolymer is preferable from the viewpoint of good balance between impact resistance, heat resistance and mechanical strength. The block copolymer is used in an amount of 5 to 500 parts by weight per 100 parts by weight of polyethylene terephthalate. If the amount of the block copolymer is less than 5 parts by weight, the effect of accelerating the crystallization produced by the polyether block in the block copolymer is scarcely expected and the use of such a mixture is substantially the same as the use of polyethylene terephthalate alone.

Polymers containing at least one epoxy group per molecule and having a modulus of elasticity in bending as measured by the procedure of ASTM D790 of most $10^4$ kg/cm$^2$ at room temperature (about 23° C.) are used in the present invention as the component (b). The epoxy group can attach to the polymers in the form of glycidyl ether group, glycidyl ester group, glycidylamino group, or a group derived from a reaction of an N-heterocycle-containing compound and epichlorohydrin as well as epoxy group.

Examples of the epoxy-containing polymer (b) are, for instance, a copolymer of an α-olefin and an α,β-unsaturated carboxylic acid glycidyl ester or a polymerizable double bond-containing glycidyl ether; a polyolefin to which a glycidyl ether group is introduced such as polyolefins having glycidyl ether group at one or both ends; a copolymer of an alkyl acrylate or methacrylate having a C$_1$ to C$_{24}$ alkyl group and glycidyl acrylate or methacrylate or allylglycidyl ether such as an ethyl acrylate/glycidyl acrylate or methacrylate copolymer or a butyl acrylate/allyglycidyl ether copolymer; a graft copolymer of 1 to 90% by weight of methyl acrylate or methacrylate with 99 to 10% by weight of ethylene/glycidyl acrylate or methacrylate; both end epoxidated polybutadiene; epoxidated 1,2-polybutadiene; and the like.

The epoxy-containing polymer is effective for improving the impact resistance of polyester molded articles so long as at least one epoxy group is present in the molecule. Preferably, the content of units having epoxy group in the polymer is at least 1% by mole from the viewpoint of the improvement in impact resistance. When the content of the units having epoxy group is more than 10% by mole, the impact resistance of molded articles tends to decrease.

Also, the epoxy-containing polymer having a modulus of elasticity in bending of more than $10^4$ kg/cm$^2$ at room temperature should be avoided, since the effect of improving the impact resistance is decreased.

Preferable epoxy-containing polymers (b) are copolymers of one or more of α-olefins such as ethylene, propylene, 1-butene, 1-hexene and 1-octane and one or more of α,β-unsaturated caboxylic acid glycidyl esters or polymerizable double bond-containing glycidyl ethers such as glycidyl acrylate, glycidyl methacrylate, cyclohexene-4-carboxylic acid glycidyl ester and allyl glycidyl ether. The copolymers may contain a minor amount of other copolymerizable monomers, e.g. at most 10% by mole of vinyl acetate, methyl acrylate or methyl methacrylate. Representative examples of the α-olefin/glycidyl ester or ether copolymers are, for instance, ethylene/glycidyl (meth)acrylate copolymer (e.g. random copolymer of ethylene and glycidyl methacrylate in a ratio of 9:1 by weight having a flow rate of 3.0 g/10 min., or ethylene/glycidyl methacrylate copolymer commercially available under the trade mark "Bondfast" 2C made by Sumitomo Chemical Co., Ltd.), a ternary copolymer of ethylene, glycidyl (meth)acrylate and vinyl acetate (e.g. ethylene/glycidyl methacrylate/vinyl acetate copolymer commercially available under the trade mark "Bondfast" 7B made by Sumitomo Chemical Co., Ltd.), ethylene/propyleneglycidyl methacrylate/vinyl acetate copolymer, and ethylene/allyl glycidyl ether copolymer. The content of the glycidyl ester or ether in the copolymer is preferably from 1 to 30% by weight, especially 5 to 20% by weight. The content of not less than 1% by weight is preferred, since the improvement in impact resistance is sufficiently exhibited and the compatibility with polyethylene terephthalate is good. Also, the content of more that 30% by weight should be avoided, since the fluidity of the resin composition may be decreased.

The epoxy-containing polymer (b) is used in an amount of 1 to 100 parts by weight, preferably 5 to 30 parts by weight, per 100 parts by weight of the thermoplastic polyester (a). When the amount of the epoxy-containing polymer (b) is less than 1 part by weight, the impact resistance is not sufficiently improved, and when the amount is more than 100 parts by weight, the mechanical strength is markedly decreased.

The component (c) used in the present invention is copolymers of α-olefins and α,β-unsaturated carboxylic acids wherein at least 5% by mole of the carboxyl groups are neutralized with an alkali metal. They are known as ionomers. Examples of the α-olefin are, for instance, ethylene, propylene, 1-butene, 1-octene, 1-hexene, and the like. The α-olefin may be used alone or in admixture thereof. Examples of the α,β-unsaturated carboxylic acid are, for instance, a monocarboxylic acid such as acrylic acid, methacrylic acid or crotonic acid, and a dicarboxylic acid such as melaic acid or fumaric acid. The carboxylic acids may be used alone or in admixture thereof. Preferably, the content of the α-olefin in the ionic copolymer (c) is at least 50% by weight, especially from 50 to 95% by weight.

At least 5% by mole, preferably at least 30% by mole, more preferably at least 40% by mole, of the acid groups are neutralized with an alkali metal such as sodium or potassium. When the degree of neutralization is at least 5% by mole, the molded articles prepared from the compositions of the present invention have a greatly improved toughness. This improvement is marked particularly when at least 30% by mole of carboxyl groups are neutralized with sodium ion.

The ionic copolymer (c) may contain at most 25% by weight, preferably at most 10% by weight, of other copolymerizable monomers, e.g. alkyl (meth)acrylates having a $C_1$ to $C_{10}$ alkyl group such as methyl acrylate, methyl methyacrylate or butyl acrylate.

The copolymer (c) is used in an amount of 0.5 to 100 parts by weight, preferably 0.5 to 50 parts by weight, more preferably 2 to 20 parts by weight, per 100 part by weight of the polyester (a). When the amount of the copolymer (c) is less than 0.5 part by weight, the impact resistance, crystallization rate and heat resistance are not sufficiently improved. When the amount is more than 100 parts by weight, mechanical strength is remarkably lowered.

From the viewpoint of the improvement in impact resistance of molded articles, it is preferable that the copolymer (c) has a modulus of elasticity in bending of not more than $10^4$ kg/cm$^2$ at room temprature (about 23° C.).

The composition of the present invention may contain usual additives which have been generally used for resin compositions, for example, stabilizer, coloring agent, antistatic agent, flame retarder, processing improver, crystallizing agent, a reinforcing material such as glass fiber or carbon fiber, a filler such as talc, mica, glass beads or calcium carbonate, and the like.

The composition of the present invention can be prepared by known methods, for example, can be prepared into a suitable form such as pellets by melt-blending in an extruder.

The components (a), (b) and (c) may be blended at once, or the components (b) and (c) may be previously melt-blended and then blended with the polyester (a). In the latter case, a part of the polyester (a) may be previously melt-blended with the components (b) and (c) and the residual polyester (a) be further blended therewith, whereby occurrence of gellatin upon processing the composition can be avoided or decreased. The polyester to be previously blended with the components (b) and (c) can be replaced by a different kind of polyester.

Accordingly, in one of preferable embodiments of the present invention, the epoxy-containing polymer (b) is melt-blended with 5 to 100 parts by weight, preferably 40 to 80 parts by weight, more preferably 60 to 75 parts by weight, of the ionic copolymer (c) and optionally at most 66 parts by weight of the thermoplastic polyester (a), respectively, per 100 parts by weight of the polymer (b).

The blending of the components (b) and (c) and optionally with the component (a) is carried out at a temperature of 150° to 300° C., preferably 170° to 280° C. When the blending temperature exceeds 250° C., gellation tends to occur. However, even if the composition of the invention is prepared using the gelled material, it provides molded articles having an improved impact resistance.

The thus obtained blend is then melt-blended with the polyester (a) in an amount of 5 to 100 parts by weight, preferably 10 to 60 parts by weight, per 100 parts by weight of the polyester (a) under the same condition as above in a known manner, for example, by an extruder, to provide the composition of the present invention. When the amount of the previously formed blend is less than 5 parts by weight per 100 parts by weight of the component (a) to be admixed in the second stage, the impact resistance is not sufficiently improved, and when the amount exceeds 100 parts by weight, the mechanical strength and heat resistance tend to lower.

The composition of the present invention can be molded by various methods such as extrusion and injection molding. The obtained moldings have excellent properties such as impact resistance, mechanical strength and heat resistance and, therefore, are suited as housing for light electrical appliances, automobile parts, body for power tools, and the like.

The present invention is more specifically described and explained by means of the following Examples in which all parts and % are by weight unless otherwise noted. It is to be understood that the present invention is nopt limited to the Examples.

In the Examples, the intrinsic viscosity shows the value measurede at 25° C. with respect to a 0.5% by weight solution in a mixed solvent of phenol and 1,1,2,2-tetrachloroethane in a ratio of 1:1 by weight.

EXAMPLES 1 to 3

A mixture of 30% of bisphenol A-ethylene oxide addition polymerization product having an average molecular weight of 1,000 (trade mark "Nissan Uniol" DA-1,000, product of Nippon Oil and Fats Co., Ltd.) and 70% of a polyethylene terephthalate oligomer (about pentamer) was melt-blended under reduced pressure to produce a modified polyethylene terephthalate having an intrinsic viscosity of 0.80 wherein the oligomer was copolymerized with the addition polymerization product (the modified polyethylene terephthalate being hereinafter referred to as "modified PET-1").

The modified PET-1 and polyethylene terephthalate having an intrinsic viscosity of 0.60 (hereinafter referred to as "PET") were dried to a water content of at most 0.01%. They were blended with a random copolymer of ethylene and glycidyl methacrylate in a weight ratio of 9:1 having a flow rate of 3.0 g/10 min. measured according to ASTM D 1238 E (hereinafter referred to as "b-1" component) and a sodium salt of ethylene/α,β-unsaturated carboxylic acid copolymer (ethylene content according to elemental analysis: about 87%, degree of neutralization of carboxyl groups with sodium ion: about 50%, commercially available under the trade mark "Hillman" 1707 made by Mitsui DuPont Polychemical Co., Ltd.) (hereinafter referred to as "c-1" component) in the ratio shown in Table 1.

Each of the obtained blends was incorporated with 0.2 part of tetrakis[methylene-3-(3',5'-di-t-butyl-4'-hydroxyphenyl)propionate]methane, 0.2 part of trsi(2,4-di-t-butylphenyl)phosphite and 0.44 part of pentaerythritoltetrakis(β-laurylthiopropionate), respectively, per 100 parts of the total of the polymers and the filler mentioned after. After mixing them, the mixture was melt-blended by a biaxial extruder (model PCM-45 made by Ikegai Tekko Kabushiki Kaisha), and extruded while feeding chopped glass fiber (diameter:10 μm, length: about 3 mm) to the middle portion of the cylinder, and then formed into pellets. Upon extrusion, there was maintained a temperature gradient of 280° C. at the hopper side of 270° C. at the die side. With respect to other extrusion conditions, general conditions were selected so that the extrusion was stably effected.

The pellets were dried so as to decrease the water content to less than 0.02%. Test specimens were prepared therefrom by using an injection molding machine (model IS-75E made by Toshiba Kikai Kabushiki Kaisha), and the properties of the moldings were measured and estimated according to the following methods. The injection molding for the preparation of test specimens excepting heat distortion test was effected at a mold temperature of 60° C.

The results are shown in Table 1.

Tensile strength

Measurement was made according to ASTM D 638.

Impact strength by falling weight method

The test was made with respect to specimens having a thickness of 3 mm using an egg apple type weight of 500 g in weight and ⅜ inch in top portion radius R. The 50% failure height (the height which causes the failure of 50% of the number of test pieces tested) is shown in the table.

Temperature of mold required for the heat distortion temperature (HDT) to exceed qb 160° C.

Moldings having a thickness of 1/16 inch were prepared as test specimens according to ASTM D 64856 Note-1 at varied mold temperatures. HDT was measured under application of a load of 18.6 kg/cm$^2$, and the mold temperature required for the molding to have a HDT over 160° C. was found.

Izod impact strength (notched)

Measurement was made according to ASTM D 256.

Flexural elongation

With respect to test specimens having a thickness of ¼ inch, measurement was made according to ASTM D 790.

COMPARATIVE EXAMPLE 1

The procedure of Example 1 was repeated except that the b-1 component was replaced by the c-1 component.

The results are shown in Table 1.

COMPARATIVE EXAMPLE 2

The procedure of Example 1 was repeated except that the c-1 component was replaced by the b-1 component.

The results are shown in Table 1 .

TABLE 1

|  | Ex. 1 | Ex. 2 | Ex. 3 | Com. Ex. 1 | Com. Ex. 2 |
|---|---|---|---|---|---|
| Ingredients (parts) | | | | | |
| Modified PET-1 | 16 | 16 | 16 | 16 | 16 |
| PET | 31 | 31 | 31 | 31 | 31 |
| b-1 | 6 | 9 | 12 | — | 18 |

TABLE 1-continued

|  | Ex. 1 | Ex. 2 | Ex. 3 | Com. Ex. 1 | Com. Ex. 2 |
|---|---|---|---|---|---|
| c-1 | 12 | 9 | 6 | 18 | — |
| Glass fiber | 35 | 35 | 35 | 35 | 35 |
| Tensile strength (kg/cm$^2$) | 1230 | 1200 | 1150 | 1250 | 1010 |
| Falling weight impact strength (cm) | 35 | 40 | 54 | 14 | 41 |
| Mold temperature to provide HDT over 160° C. (°C.) | 80 | 81 | 83 | 80 | 87 |
| Izod impact strength (notched) (kg · cm/cm) | 17.8 | 19.0 | 20.8 | 11.0 | 18.8 |
| Flexural elongation (%) | 4.4 | 4.4 | 4.5 | 3.7 | 4.3 |

EXAMPLES 4 and 5

A modified polyethylene terephthalate having an intrinsic viscosity of 0.65 (hereinafter referred to as "modified PET-2") was produced in the same manner as in Example 1 except that 35% of an addition polymerization product of ethylene oxide with polypropylene glycol (ethylene oxide/propylene oxide=20/80 by weight; average molecular weight 1,300; commercially available under the trademark "Nissan Unilub" 20DP/15B made by Nippon Oil and Fats Co., Ltd.) was used instead of 30% of the bisphenol A-ethylene oxide addition polymerization product and reacted with 65% of the polyethylene terephthalate oligomer.

Polyester resin compositions were prepared in the same manner as in Example 1 by using the modified PET-2 and the ingredients shown in Table 2.

The results are shown in Table 2.

In Table 2, the abbreviations show the following materials.

b-2: Ethylene/glycidyl methacrylate/vinyl acetate copolymer (85/10/5 by weight, melt index 7, product of Sumitomo Chemical Co., Ltd. sold under the trade mark "Bondfast" 7B)

b-3: Ethylene/glycidyl methacrylate copolymer (95/5 by weight, melt index 3, product of Sumitomo Chemical Co., Ltd. sold under the trade mark "Bondfast" 2C)

c-2: Sodium ionic copolymer of ethylene and an α,β-unsaturated carboxylic acid (ethylene content measured according to elemental analysis: about 86 %, degree of neutralization of carboxyl groups by sodium ion: about 30% by mole, product of Mitsui DuPont Polychemical Co., Ltd. sold under the trade mark "Himilan" 1605)

c-3: Sodium ionic copolymer of ethylene and an α,β-unsaturated carboxylic acid (ethylene content measured according to elemental analysis: about 91%, degree of neutralization of carboxyl groups by sodium ion: about 49% by mole, product of Mitsui DuPont Polychemical Co., Ltd. sold under the trade mark "Himilan" 1601)

EXAMPLE 6

The procedure of Example 4 was repeated except that the modified PET-2 was replaced by PET.

The results are shown in Table 2.

COMPARATIVE EXAMPLE 3

The procdure of Example 4 was repeated except that an ethylene/acrylaic acid copolymer which was not neutralized with an alkali metal ion (product of Dow Chemical Japan Co., Ltd. sold under the trade mark "Primacol" 3330, herinafter referred to as "c-4" component) was used instead of the sodium ionic copolymer c-2.

The results are shown in Table 2.

TABLE 2

|  | Ex. 4 | Ex. 5 | Ex. 6 | Com. Ex. 3 |
|---|---|---|---|---|
| Ingredients (parts) |  |  |  |  |
| Modified PET-2 | 10 | 10 | — | 10 |
| PET | 55 | 55 | 65 | 55 |
| Component (b): Kind | b-2 | b-3 | b-2 | — |
| Amount | 15 | 15 | 15 | — |
| Component (c): Kind | c-2 | c-3 | c-2 | c-4 |
| Amount | 5 | 5 | 5 | 5 |
| Glass fiber | 15 | 15 | 15 | 15 |
| Tensile strength (kg/cm$^2$) | 848 | 850 | 940 | 590 |
| Falling weight impact strength (cm) | 42 | 35 | 38 | 12 |
| Mold temperature to provide HDT over 160° C. (°C.) | 105 | 105 | 110 | 109 |
| Izod impact strength (notched) (kg · cm/cm) | 13.7 | 11.9 | 12.0 | 7.2 |
| Flexural elongation (%) | 6.0 | 5.8 | 4.0 | 2.5 |

EXAMPLE 7 AND COMPARATIVE EXAMPLES 4 AND 5

Polyester resin compositions were prepared by adding, to 100 part of the polymer component shown in Table 3, 0.2 part of tetrakis[methylene-3-(3',5'-di-t-butyl-4'-hydroxyphenyl)propionate]methane, 0.2 part of tris(2,4-di-t-butylphenyl)phosphite, 0.44 part of pentaerythrioltetrakis(β-laurylthipropionate), 0.1 part of sodium octacosanoate and 1.0 part of talc.

With respect to the thus prepared compositions, the injection molding was effected at a mold temperature of 85° C., and the tensile strength, elongation and HDT of the obtained moldings were measured. The HDT was measured under a load of 4.6 kg/cm$^2$ according to ASTM D 648 with respect to specimens having a thickness of ¼ inch.

The results are shown in Table 3.

TABLE 3

|  | Ex. 7 | Com. Ex. 4 | Com. Ex. 5 |
|---|---|---|---|
| Ingredients (parts) |  |  |  |
| Modified PET-1 | 37 | 37 | 37 |
| PET-1 | 58 | 58 | 58 |
| b-1 | 3 | 5 | — |
| c-1 | 2 | — | 5 |
| Tensile strength (kg/cm$^2$) | 490 | 450 | 420 |
| HDT (4.6 kg/cm$^2$) (°C.) | 120 | 109 | 124 |
| Elongation (%) | 170 | 155 | 120 |

EXAMPLES 8 to 12 and COMPARATIVE EXAMPLES 6 to 8

To the component (B) (water content: below 0.02% shown in Table 4 composed of an epoxy-containing polymer (1), an ionic copolymer (2) and/or a thermoplastic polyester (3), 0.2 part of tetrakis-[methylene-3-(3',5'-di-t-butyl-4'-hydroxyphenyl)-propionate]methane, 0.2 part of tris(2,4-di-t-butylphenyl)phosphite and 0.4 part of pentaerythrioltetrakis(β-laurylthiopropionate) were added respectivel based on the total weight of the polymers (1), (2) and/or (3). The mixture was melt-blended and extruded at 280° C. using an extruder (model PCM-45 made by Ikegai Tekko Kabushiki Kaisha).

To the obtained polymer blend dried to a water content of less than 0.02%, the polyester component (A) (water content: less than 0.02%) shown in Table 4 was added in the amount shown in Table 4 and admixed.

The mixture was melt-blended at 270° C. using the extruder, and extruded to give a resin composition while adding 30 parts of glass fibers (diameter:9.5 μm, length:3 mm) to the cylinder of the extruder.

The obtained resin composition was dried to a water content of less than 0.02%, and was injection-molded to give test pieces having a size of 120×120×3 mm. The falling weight impact strength (50% failure height) of the moldings was measured.

The results are shown in Table 4.

In Table 4, the abbreviations show the following materials.

PET: Polyethylene terephthalate having an inherent viscosity of 0.60

PBT: Polybutylene terephthalate (trade mark "Toray PBT" 1401-X07, made by Toray industries, Inc.)

MPET:1: Modified PET-1 mentioned before

MPET-3: Modified polyethylene terephthalate having an intrinsic viscosity of 0.60 prepared by copolymerizikng 80% of a polyethylene terephthalate oligomer with 20% of a block copolymer wherein 25% of polyethylene glycol is bonded through ether bond to both ends of 75% of polypropylene glycol, by melt-blending them under reduced pressure.

EGMA: b-1 mentioned before, namely ethylene/-glycidyl methacrylate copolymer (9/1 by weight, flow rate 3.0 g/10 min.)

BAAGE: Butyl acrylate/allyl glycidyl ether copolymer having a Mooney viscosity of 30 (allyl glycidyl ether content:4.5%)

EGMAVA: b-2 mentioned before, namely ethylene/-glycidyl methacrylate/vinyl acetata copolymer (85/10/5 by weight) having a melt index of 7 g/10 min. (ASTM D-1238)

EGMACP: Graft copolymer of 30 parts of methyl methacrylate with 70 parts of copolymer of 85% of ethylene and 15% of glycidyl methacrylate EMANa-1: Random copolymer of 87% of ethylene, 6.5% of methacrylic acid and 6.5% of methacrylic acid sodium salt having an MI of 1.0 g/10 min. (ASTM D-1238)

EMANa-2: Random copolymer of 86% of ethylene, 10% of methacrylic acid and 4% of methacrylic acid sodium salt having an MI of 2.8 g/10 min. (ASTM D-1238)

EAA: Random copolymer of 94% of ethylene and 6% of acrylic acid

I- addition to the ingredients used in the Examples, other ingredients can be used in the Examples as set forth in the specification to obtain substantially the same results.

TABLE 4

| | Polyester (A) (parts) | | | | Component (B) (parts) | | | | | |
| --- | --- | --- | --- | --- | --- | --- | --- | --- | --- | --- |
| | | | | | Epoxy-containing polymer (1) | | | | Ionic copolymer (2) | |
| | PET | PPBT | MPET-1 | MPET-3 | EGMA | BAAGE | EGMAVA | EGMAGP | EMANa-1 | EMANa-2 |
| Ex. 8 | 4 | — | 28 | — | 20 | — | — | — | 8 | — |
| Ex. 9 | — | — | — | 40 | — | 15 | — | — | — | 15 |
| Ex. 10 | 30 | — | — | — | — | — | 20 | — | 10 | — |
| Ex. 11 | 10 | — | 40 | — | — | — | — | 10 | 10 | — |
| Ex. 12 | — | 55 | — | — | — | — | 10 | — | — | 5 |
| Com. Ex. 6 | 15 | — | 25 | — | 15 | — | — | — | — | — |
| Com. Ex. 7 | 20 | — | 30 | — | 20 | — | — | — | — | — |
| Com. Ex. 8 | — | — | — | 50 | — | — | — | — | 20 | — |

| | Component (B) (parts) | | | Resin composition (parts) | | | Falling weight |
| --- | --- | --- | --- | --- | --- | --- | --- |
| | Ployester (3) | | | | | | |
| | PET | MPET-1 | EAA | Total of (A) | Total of (B) | Glass fiber | impact strength (cm) |
| Ex. 8 | 10 | — | — | 32.0 | 38.0 | 30.0 | 55 |
| Ex. 9 | — | — | — | 40.0 | 30.0 | 30.0 | 57 |
| Ex. 10 | — | 10 | — | 30.0 | 40.0 | 30.0 | 48 |
| Ex. 11 | — | — | — | 50.0 | 20.0 | 30.0 | 46 |
| Ex. 12 | — | — | — | 55.0 | 15.0 | 20.0 | 48 |
| Com. Ex. 6 | — | — | 15 | 40.0 | 30.0 | 30.0 | 32 |
| Com. Ex. 7 | — | — | — | 50.0 | 20.0 | 30.0 | 39 |
| Com. Ex. 8 | — | — | — | 50.0 | 20.0 | 30.0 | 29 |

What we claim is:

1. A polyester resin composition comprising:
   (a) a thermoplastic polyester,
   (b) 1 to 100 parts by weight of a polymer containing a least one epoxy group per molecule and having a modulus of elasticity in bending of at most $10^4$ kg/cm$^2$ as determined by the procedure of ASTM D790 at room temperature, and
   (c) 0.5 to 100 parts by weight of a copolymer of an α-olefin and an α,β-unsaturated carboxylic acid wherein at least 5% by mole of the carboxyl groups are neutralized with an alkali metal, said parts being parts by weight per 100 parts by weight of the component (a), said thermoplastic polyester (a) being a block copolymer of polyethylene terephthalate and a polyether compound of the formula (2):

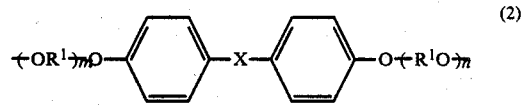

wherein

R$^1$ is a bivalnet hydrocarbon group having 2 to 4 carbon atoms,

X is a single bond or a bivalent group selected from —C(CH$_3$)$_2$—, —CH$_2$—, —S—, —SO$_2$— and —CO—, m and n are independently an integer of 5 to 20, and the R$^1$ groups in respective recurring units may be different from each other, and the derivatives of the polyether compound (2) having an ester-forming ability.

2. The composition of claim 1, wherein said epoxy-containing polymer (b) is a polymer having a group selected from the group consisting of glucidyl ether group, glycidyl ester group, glycidyl amino group and a group derived from a reaction of an N-heterocycle-containing compound and epichlorohydrin.

3. The composition of claim 1, wherein said epoxy-containing polymer (b) is a copolymer of an α-olefin and 1 to 30% by weight of an α, β-unsaturated carboxylic acid glycidyl ester or a polymerizable double bond-containing glycidyl ether.

4. The composition of claim 1, wherein said epoxy-containing polymer (b) is a member selected from the group consisting of an ethylene/glycidyl (meth)acrylate copolymer, an alkyl acrylate/glycidyl (meth)acrylate copolymer, an alkyl acrylate/ally glycidyl ether copolymer, an ethylene/glycidyl (meth)acrylate/vinyl acetate copolymer, and a graft copolymer of 1 to 90% by weight of methyl (meth)acrylate with 99 to 10% by weight of an ethylene/glycidyl (meth)acrylate copolymer.

5. The composition of claim 1, wherein said copolymer (c) is a copolymer of an α-olefin, an α, β-unsaturated carboxylic acid and an alkyl acrylate or methacrylate having a $C_1$ to $C_{10}$ alkyl group.

6. A polyester resin composition comprising:
(a) a polyethylene terephthalate resin,
(b) 1 to 100 parts by weight of a copolymer of an α-olefin and 1 to 30% by weight of an α, β-unsaturated carboxylic acid glycidyl ester or a glycidyl ether compound, and
(c) 0.5 to 50 parts by weight of a copolymer of an α-olefin and an α, β-unsaturated carboxylic acid wherein at least 5% by mole of the carboxyl groups are neutralized with an alkali metal, said parts being parts by weight per 100 parts by weight opf said polyethylene terephthalate resin (a), and said polyethylene terephthalate resin being a block copolymer of polyethylene terephthalate and a polyether compound of the formula (2):

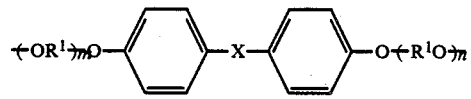
(2)

wherein
$R^1$ is a bivalent hydrocarbon group having 2 to 4 carbon atoms,
X is a single bond or a bivalent group selected from —C(CH$_3$)$_2$—, —CH$_2$—, —S—, —SO$_2$— and —CO—,
m and n are independently an integer of 5 to 20, and the $R^1$ groups in respective recurring units may be different from each other,
and the derivatives of the polyether compound (2) having an ester-forming ability.

7. The composition of claim 6, wherein said copolymer (b) has a modulus of elasticity in bending as determined by the procedure of ASTM D790 of not more than $10^4$ kg/cm$^2$ at room temperature.

8. The composition of claim 6, wherein said copolymer (c) has a modulus of elasticity in bending as determined by the procedure of ASTM D790 of not more than $10^4$ kg/cm$^2$ at room temperature.

9. A polyester composition comprising:
(A) 100 parts by weight of a thermoplastic polyester, and
(B) 5 to 100 parts by weight of a melt-blended mixture comprising:
(1) a polymer containing at least one epoxy group per molecule and having a modulus of elasticity in bending as determined by the procedure of ASTM D790 of not more than $10^4$ kg/cm$^2$ at room temperature.
(2) 5 to 100 parts by weight of a copolymer of an α-olefin and an α, β-unsaturated carboxylic acid wherein at least 5% by mole of the carboxyl groups are neutralized with an alkali metal, said copolymer having a modulus of elasticity in bending as determined by the procedure of ASTM D790 of not more than $10^4$ kg/cm$^2$ at room temperature, and
(3) 0 to 66 parts by weight of a thermoplastic polyester said parts of (2) and (3) being parts by weight per 100 parts by weight of said epoxy-containing polymer (1), wherein said thermoplastic polyester is a block copolymer of polyethylene terephthalate and a polyether compound of the formula (2):

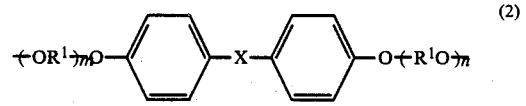
(2)

wherein
$R^1$ is a bivalent hydrocarbon group having 2 to 4 carbon atoms,
X is a single bond or a bivalent group,
m and n are independently an integer of 5 to 20, and the $R^1$ groups in respective recurring units may be different from each other, and the derivatives of the polyether compound (2) having an ester-forming ability.

10. The composition of claim 9, wherein said epoxy-containing polymer (1) is a member selected from the group consisting of an ethylene/glycidyl (meth)acrylate copolymer, an alkyl acrylate/glycidyl (meth)acrylate copolymer, an alkyl acrylate/allyl glycidyl ether copolymer, an ethylene/glycidyl (meth)acrylate/vinyl acetate copolymer, and a graft copolymer of 1 to 90% by weight of methyl (meth)acrylate with 99 to 10% by weight of an ethylene/glycidyl (meth)acrylate copolymer.

11. The composition of claim 9, wherein said copolymer (2) is a copoly,er of ethylene and acrylic or methacrylic acid wherein at least 5% by mole of the acids are netralized with an alkali metal.

* * * * *